Figure 1:
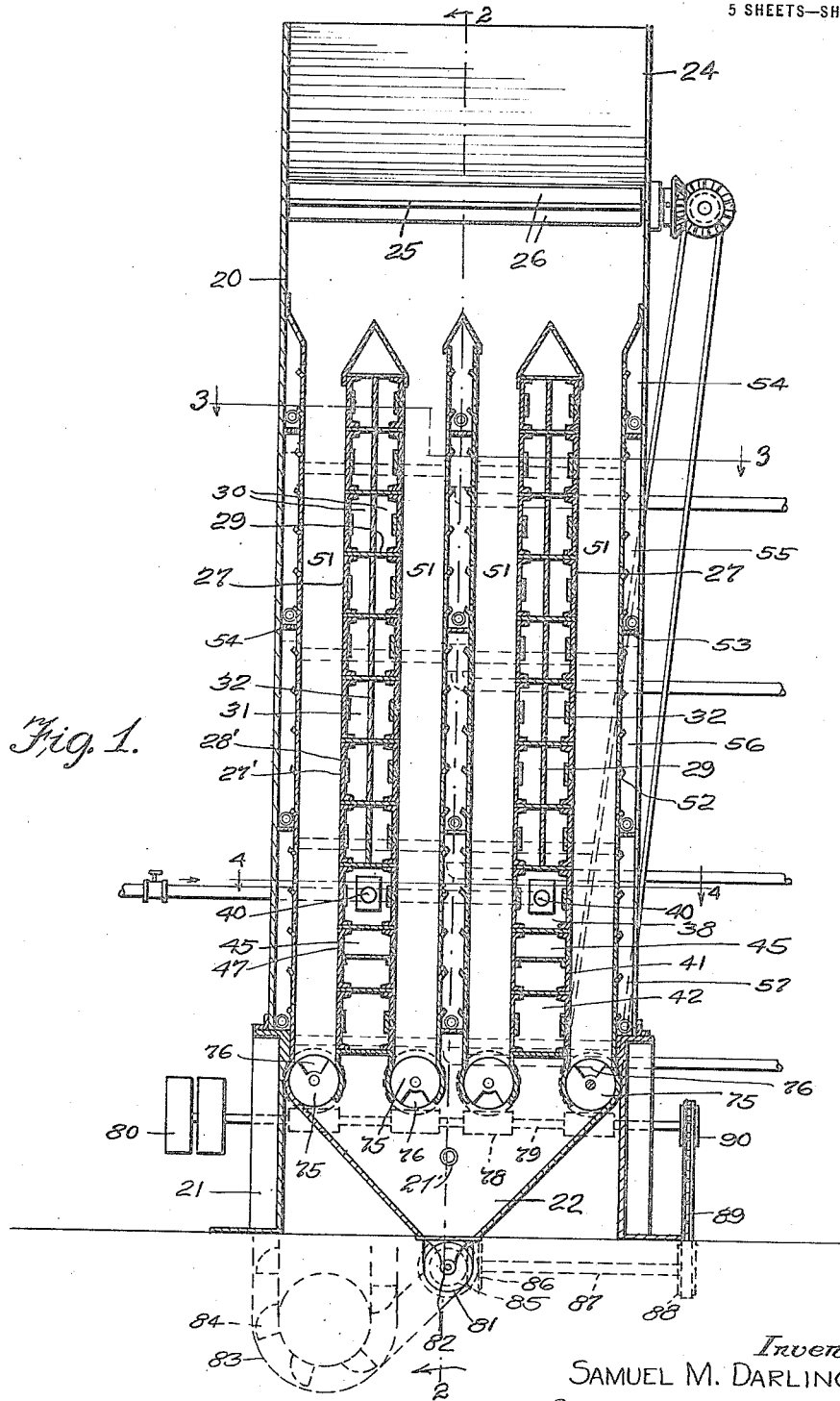

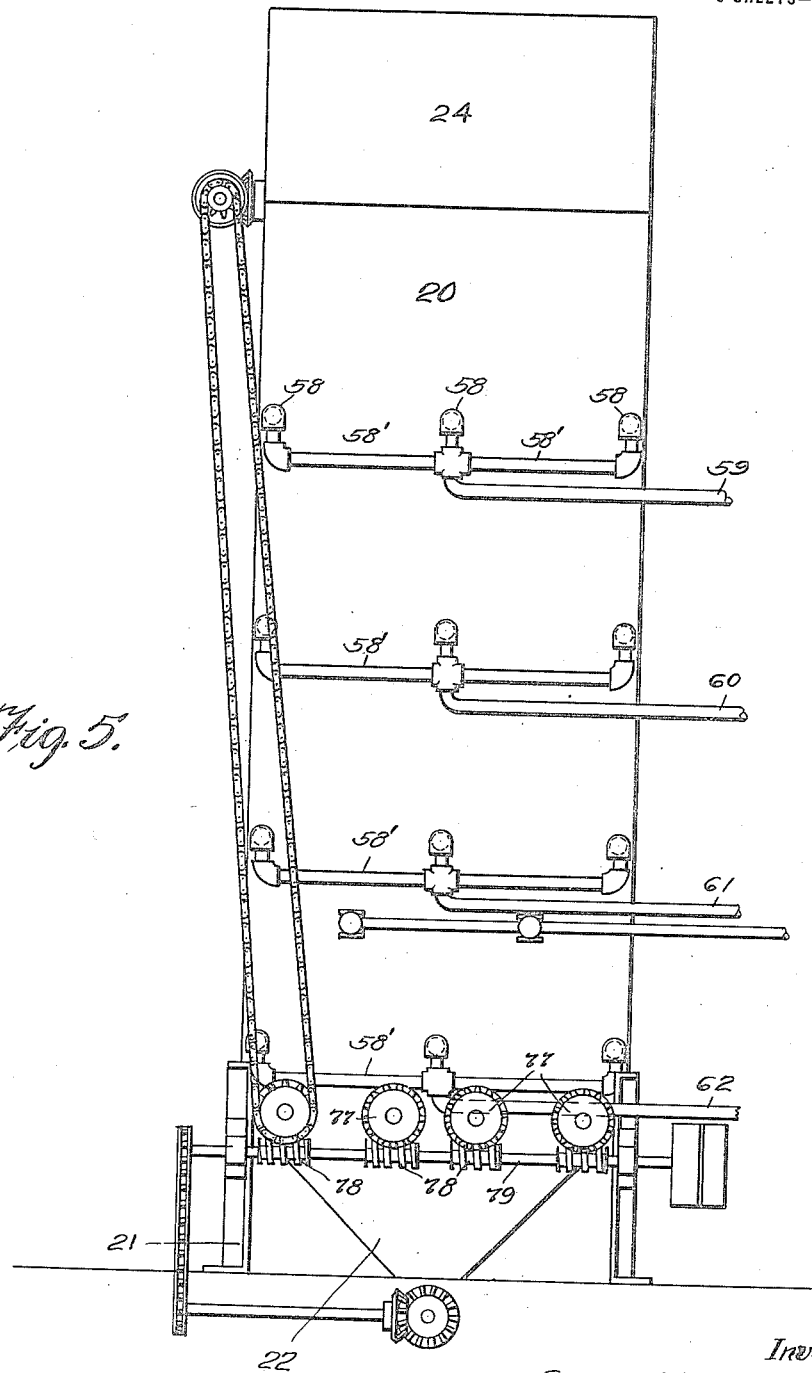

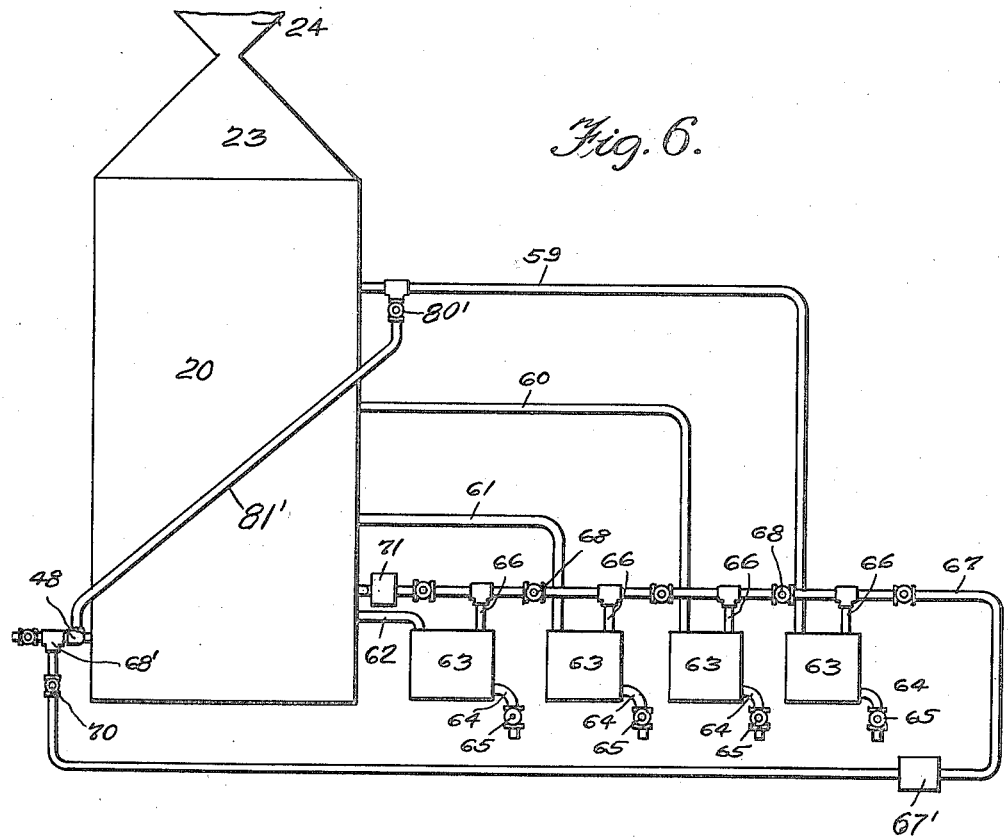
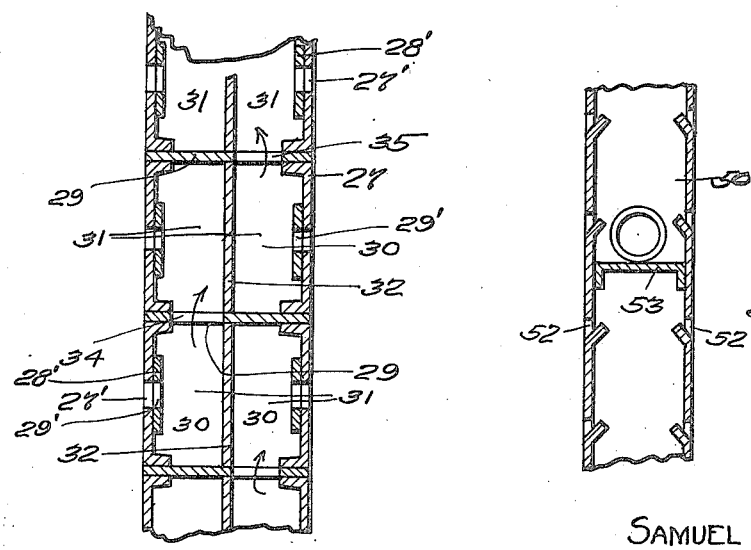
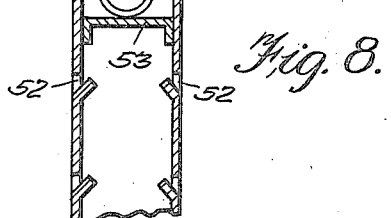

UNITED STATES PATENT OFFICE.

SAMUEL M. DARLING, OF WASHINGTON, DISTRICT OF COLUMBIA.

PROCESS OF AND APPARATUS FOR DISTILLING OCOTILLO AND THE LIKE.

1,384,939. Specification of Letters Patent. Patented July 19, 1921.

Application filed February 21, 1919. Serial No. 278,470.

*To all whom it may concern:*

Be it known that I, SAMUEL M. DARLING, a citizen of the United States, residing at Washington, in the District of Columbia, have invented certain new and useful Improvements in Processes of and Apparatus for Distilling Ocotillo and the like, of which the following is a specification.

My invention relates to a process of and apparatus for distilling ocotillo and the like to recover various gums, resins, acids, gases, and other substances therefrom.

An important object of the invention is to provide means whereby the process of distillation may be carried out continuously and in a graduated manner, thus affording a continuous separation and recovery of the several distillates as the process continues.

Another object of the invention is to provide means whereby the distillates which are driven off at different temperatures in the several zones may be separately withdrawn and recovered, thus greatly simplifying the matter of subsequent fractional distillation of the distillates.

A further object of the invention is to provide means whereby the distillates are withdrawn from the apparatus in such a manner that they are not subjected to a temperature above that at which they are generated, thus obviating any secondary reaction due to contact with hot walls or hot material being distilled.

A further object of the invention is to provide means whereby the distillates are withdrawn from the apparatus in such a manner that they are not subjected to successive or repeated condensations and volatilizations.

A further object of the invention is to provide means for utilizing the heat from the residue for preheating the air passing to the burner or burners, thereby effecting economy in fuel through heat recuperation and more efficient combustion.

A further object of the invention is to provide means for passing steam into and through the residue at the point of its highest temperature, whereby the steam washes from the residue any remaining vapors and gases and carries them rapidly off into the vapor offtakes, the reaction between the steam and the hot carbon producing hydrogen and carbon monoxid, which are good fuel gases and measurably cooling the distilled residue.

A further object of the invention is to provide means for passing the large volume of carbon dioxid, an inert gas of no fuel value, generated in the upper or zone of lowest temperature, through the distilled residue at the point of its highest temperature, the resultant reaction between the carbon dioxid and the hot carbon of the distilled residue producing carbon monoxid, a good fuel gas, and the consequent endothermic reaction greatly reducing the temperature of the distilled residue.

A further object of the invention is to provide means whereby the steam generated from the large amount of water present naturally in the ocotillo plant may be used for the exclusion of air from the distilling space and from the space wherein the residue is being finally cooled.

A further object of the invention is to provide means whereby the steam generated in the top or lowest temperature zone of the apparatus may be introduced into the bottom or highest temperature zone.

A further object of the invention is to provide means for introducing petroleum or other fuel or gas making oils into the residue at the point of its highest temperature, thus enriching the gas being recovered from the material under distillation.

A further object of the invention is to provide means for introducing paraffin oils into the residue at the point of its highest temperature, thereby cracking the oils of the paraffin series and transforming them into vapors which are subsequently recovered and condensed as oils of the benzene series.

A further object of the invention is to provide means whereby advantage may be taken in a continuously operating mechanism of the exothermic reaction which takes place when a body of carbonaceous material is heated uniformly throughout to a temperature preferably between 550 and 650° F.

A further object of the invention is to provide means whereby products of combustion or flue gases, derived either from the distilling oven itself or from outside sources, may be passed into direct contact with the comminuted ocotillo, thus expediting the carbonizing process and effecting a substantial economy in fuel.

A further object of the invention is to provide means whereby the material to be distilled may be subjected in the zone of lowest temperature, to the action of superheated steam, thus effecting a primary or preliminary distillation before the material is subjected to the high carbonizing heat of the lower zones of the oven.

A further object of the invention is to provide means whereby the steam evaporated from the material under treatment in the upper or drying zone of the oven, may be withdrawn and disposed of along with the waste flue gases of the oven.

Other objects and advantages of the invention will be apparent during the course of the following description.

Figure 2:
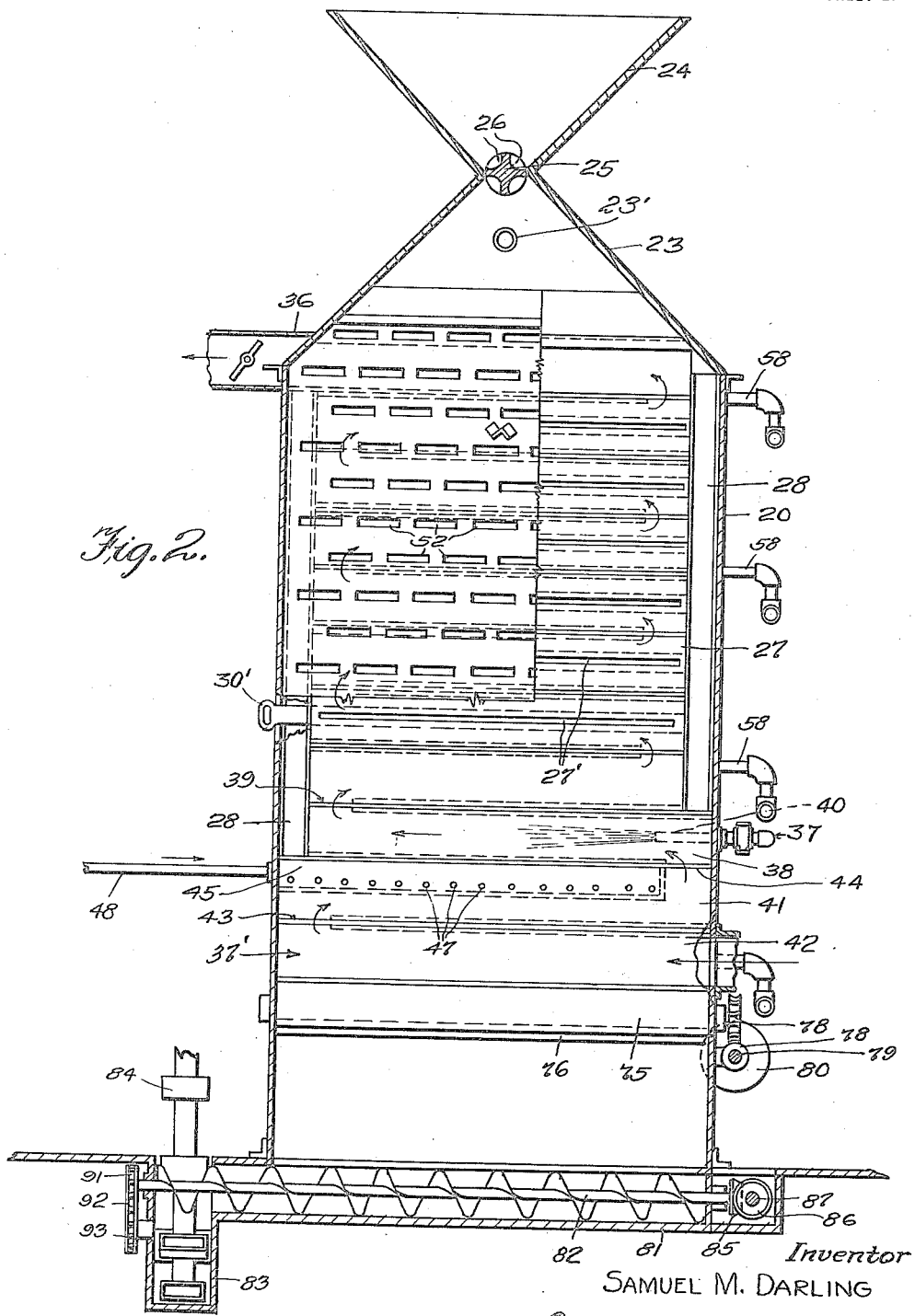
Figure 3:
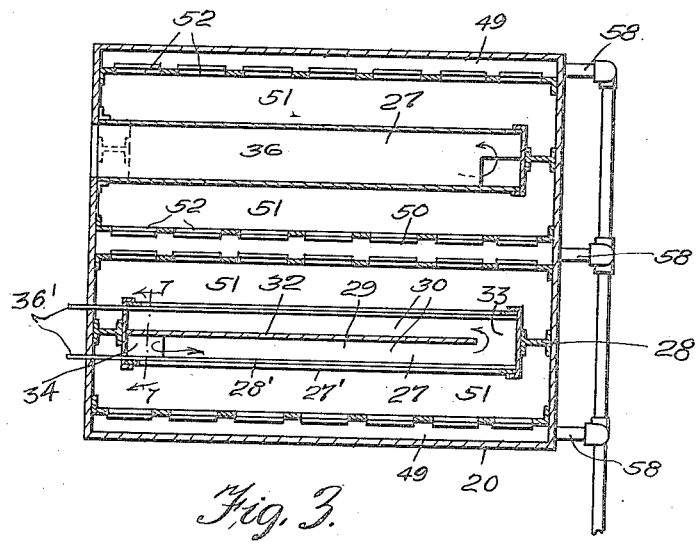
Figure 4:
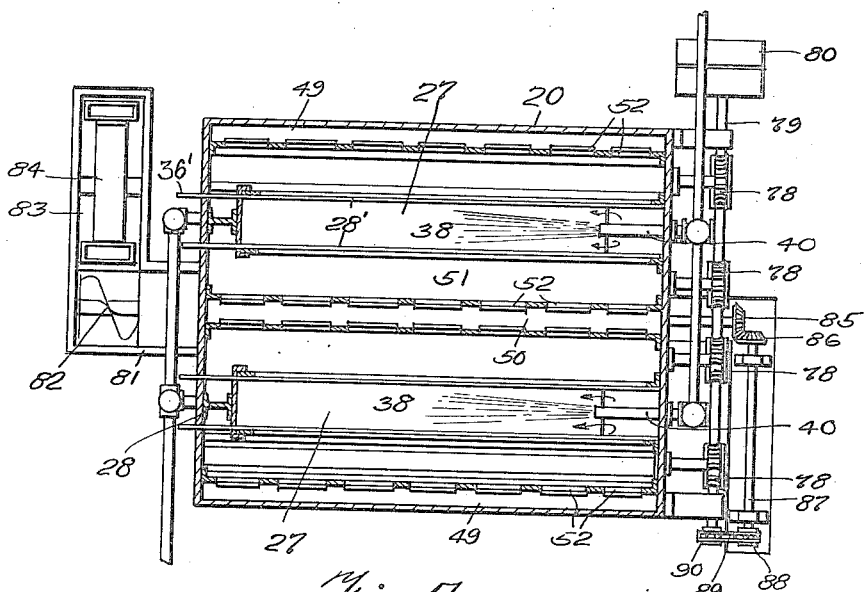

In the accompanying drawings forming a part of this specification and in which like numerals are employed to designate like parts throughout the same, Figure 1 is a central vertical sectional view through an apparatus embodying my invention, Fig. 2 is a transverse vertical sectional view taken on line 2—2 of Fig. 1, Fig. 3 is a horizontal sectional view taken on line 3—3 of Fig. 1, Fig. 4 is a similar view taken on line 4—4 of Fig. 1, Fig. 5 is an elevation of the rear side of the apparatus, Fig. 6 is a partly diagrammatic view of the complete apparatus, Fig. 7 is a vertical sectional view through one of the heating flues, taken on line 7—7 of Fig. 3, and, Fig. 8 is a detail vertical sectional view through the inner distilled vapor collecting conduit.

In the drawings wherein, for the purpose of illustration, is shown a preferred embodiment of my invention, the numeral 20 designates the main or outer casing of the distilling apparatus, preferably formed of sheet metal. The casing 20 is arranged upon and supported by a foundation 21, having a pit 22 formed therein, as shown. The top of the casing 20 is closed by a preferably tapered cover or member 23, carrying at its apex a feed hopper 24, for receiving the desiccated ocotillo. Operating within the lower portion of the hopper 24 is a rotatable feed valve 25, having pockets 26, which receive the ocotillo chips and intermittently discharge the same into the top of the casing 20, but prevent the passage of vapor into and from the casing. The feed valve is rotated by means to be described.

Extending longitudinally within the casing 20 are preferably vertical heating flues 27, spaced as shown, and rigidly attached to the front and rear walls of the casing, by I-beams 28, as clearly shown in Fig. 3. These heating flues are preferably rectangular in horizontal section, as indicated in Fig. 3. Each heating flue is divided by horizontal partitions 29, into longitudinal horizontal chambers 30. Each chamber 30 is divided into longitudinal chamber-sections 31, by a longitudinal vertical partition 32. The chamber-sections 31 communicate at their ends through openings 33. The openings 33 are alternately disposed, in the alternate chambers. The chamber-section 31 in one chamber communicates with the corresponding chamber-section 31 in the lower chamber, through an opening 34, arranged upon the left of the partition 32, in Fig. 3. The chamber-section 31 to the right of the partition 32, in Fig. 3, is in communication with the chamber-section to the right, in the next chamber-section 30 above it, through an opening 35. It is thus seen that the several horizontal chambers 30 are in communication with each other by virtue of the arrangement of the partitions 32 and openings associated therewith, and the products of combustion or flue gases are caused to travel longitudinally through each chamber 30, for its entire length in opposite directions. The uppermost chamber 30 communicates with an upper, preferably horizontal, discharge conduit 36, leading to the atmosphere. It is thus seen that the products of combustion or flue gases do not discharge into the casing 20, when the slide valves, to be described, are closed but are passed to the atmosphere, exteriorly thereof.

The heating flues 27 are provided upon their sides, with preferably elongated slots or openings 27', and slide-valves 28' are arranged inwardly of these openings. The slide-valves 28' have elongated openings 29', adapted to be moved into and out of registration with the openings 27'. The slide-valves 28' are moved by rods 30', extending to the exterior of the casing. It is thus seen that by shifting the slide-valves so that the openings 27' and 29' register, some or all of the natural flue gases will be passed into and through the ocotillo being distilled.

The numeral 37 designates combustion apparatus, arranged beneath and adjacent to each heating flue 27. This combustion apparatus comprises a combustion chamber 38, having an outlet 39, discharging into one chamber-section 31 of the lowermost chamber 30. Extending into the opposite end of the combustion chamber 38 is a burner 40, which is preferably a gas burner, while an oil burner, or any other suitable type of burner may be employed. Arranged beneath the combustion chamber 38 are air pre-heating or recuperating chambers 41 and 42, communicating with each other at one end, through an opening 43. The opposite end of the upper chamber 41 communicates with the combustion chamber 38, through an opening 44, preferably arranged near and beneath the burner 40.

The opposite end of the chamber 42 communicates with the atmosphere, for the intake of air. It might be stated at this point that the heat from the distilled residue heats the air passing through the chambers 41 and 42. This effects economy in combustion and also serves to cool the distilled residue.

Formed in the upper portion of the chamber 41 is a vapor or liquid supply chamber 45, having no communication with the chamber 41. This supply chamber has its walls formed by the walls of the chamber 41, and provided with downwardly inclined apertures 47, as shown. Steam may be supplied to the chamber 45 through a pipe 48.

The numerals 49 and 50 designate distilled vapor collecting conduits, which are vertically arranged, as shown. The conduits 49 are arranged upon the outer sides of the heating flues 27, while the conduit 50 is arranged between these heating flues, but the conduits are spaced therefrom, as shown, providing vertical feeding passages 51, for the travel of the descending ocotillo, as will be more fully explained. The conduits 49 and 50 are provided upon their sides with preferably horizontally arranged openings or slots 52, for the passage of the vaporized distillates.

The conduits 49 and 50 are provided with horizontal plates 53, serving to divide the same into horizontal zones 54, 55, 56 and 57, having no communication with each other. I preferably provide four of these zones, but it is to be understood that the invention is in no sense restricted to this precise number. Pipes 58 lead into the zones in each horizontal set, and are connected at their outer ends with manifolds 58', having their ends closed. Take-off pipes 59, 60, 61 and 62 are connected with the manifolds, at their centers, as shown.

The numeral 63 designates condensers, preferably four in number, which are preferably horizontally arranged. Each condenser is provided with an outlet pipe 64, having a valve 65, so that the condensed distillates may be withdrawn as desired. The condensers 63 are connected with the pipes 59, 60, 61 and 62, as shown. Connected with the upper portions of the condensers are pipes 66, having connection with a common pipe 67. Valves 68 are connected in the pipe 67. The pipe 67 preferably extends from the condenser 63 to the right and leads to the pipe 48 and is connected therewith by a T-coupling 68'. The pipe 67 is provided with a valve 70, arranged at or near the pipe 48, as shown. The opposite end of the pipe 67 is connected with a pump 71, which is adapted to feed the gases passing through the same to the gas burner 40. By the arrangement of the valves and pipes hereinabove described, it is possible to withdraw the vapors or gases from the condenser 63, to the right and discharge these vapors into the chamber 45, while vapors from the other condensers may be discharged to the pump 71 and hence to the burner. If desired, the vapors or a portion of the vapors from all of the condensers may be fed to the chamber 45, or to the gas burner, or to both.

Arranged at the bottom of the vertical passages 51 are rotatable residue discharge members or valves 75, having pockets 76, adapted to be filled with the residue, and to discharge the same into the pit 22. The valves 75 may be supported by any suitable means and are turned by worm-wheels 77, rigidly secured thereto, and engaging worms 78, carried by a shaft 79. This shaft receives its rotation from a pulley 80 driven by any suitable means.

The pit 22 is tapered and decreases in width downwardly, discharging into a horizontal trough 81, within which a spiral conveyer 82 operates. This spiral conveyer conducts the distilled residue through one end of the trough, into a hopper 83, to be collected thereby by an endless elevator 84, and conducted to any suitable point. This spiral conveyer has a bevel gear 85, rigidly secured to one end thereof, engaged by a bevel gear 86, rigidly secured to a shaft 87. This shaft carries a sprocket wheel 88 rigidly secured thereto, engaged by a sprocket chain 89. This sprocket chain extends upwardly to engage a sprocket wheel 90, rigidly mounted upon the shaft 79. At its opposite end, the spiral conveyer has a sprocket wheel 91, rigidly secured thereto, engaged by a sprocket chain 92, extending downwardly to engage a sprocket wheel 93, which drives the elevating endless conveyer 84.

The operation of the apparatus is as follows:

Before starting the apparatus, the vertical passages 51 and the outer casing are preferably completely filled with the preferably desiccated ocotillo, extending up to or near the rotatable feed valve 25. The bark, wood and root of the ocotillo plant may be employed in the practice of the process, and this material preferably is in the form of small pieces, chips, saw-dust or the like. This having been done, the burners 40 are set into operation, and the products of combustion pass upwardly through the heating flues 27. If the valves 27' are closed, and valve 36 is opened, these products of combustion will be confined within and travel horizontally in the chamber-sections 31, from one to the other, in an upwardly direction, and finally discharge to the atmosphere. The heat from these products of combustion will be transmitted to the mass of comminuted ocotillo, effecting the distillation thereof. This heating of the ocotillo increases gradually downwardly and the maximum degree of heat is imparted thereto at or near the lowermost zone. The vapors generated in the several zones discharge therefrom through the pipes 59, 60, 61 and 62, into the condensers 63, wherein the condensed distillates or various gums are collected and may be withdrawn through the pipes 65. The vapors or gases not condensed within these condensers are discharged upwardly into the pipe 67. By opening the three valves 68 to the left, the gases or vapors within the pipe 67 are fed to the burner 40, through the exhauster or blower 71. The gases discharging from the condenser 63 to the right pass through the pipe 67 which leads therefrom and is connected to the pipe 48, such gases being fed through the pipe 67 by the blower 67'. The gases fed into the pipe 48 through the pipe 57 contain principally steam and carbon dioxid and this mixture is fed into the chambers 45. As clearly shown in Fig. 1, the gaseous mixture within the chamber 45 discharges outwardly through the apertures 47 to contact with the carbonized residues of the ocotillo chips in the lower portion of the apparatus. As a result of this introduction of steam and carbon dioxid in the presence of the carbonized residue, the steam reacts with the carbon producing hydrogen and carbon monoxid and the carbon dioxid reacts with the carbon to produce carbon monoxid, increasing the volume of the gas in one instance and transforming an inert gas into a good fuel gas in the other. Instead of passing the gas from the top zone through the condenser, this gas may be directly fed to the pipe 48, by opening the valve 80', connected in the pipe 81'. The gases are caused to travel through the pipe 81' and into the pipe 48 by the vacuum created in the lowermost zone, due to the action of the blower 71, exhausting gas from the upper section of the pipe 67.

Instead of discharging the heated gases or products of combustion to the atmosphere, a part or all of these gases may be directly supplied in contact with the ocotillo, by shifting the slide valves 27 to the open position. The purpose of thus directly supplying the heated gases or products of combustion into direct contact with the ocotillo is to expedite the distillation of the ocotillo. The advantage of excluding the heated gases from direct contact with the ocotillo is that the gas which is thus produced is of a superior quality.

During the operation of the apparatus, as above indicated, the feed valve 25 and the discharge rollers 75 are continuously rotated at a suitable speed. As a result of this action, the ocotillo is being fed into the upper end of the furnace casing and the carbonized residue is being removed from the lower portion of the lowermost zone, thereby effecting a continuous downward or longitudinal travel of material through the apparatus during the entire operation. The carbonized residue discharging into the pit 22 is removed therefrom by the action of the spiral conveyer 82, which discharges it upon the elevating conveyer 83, before conveying it to any desired point.

The pit 22 is maintained filled with steam, at a pressure slightly above atmospheric pressure to exclude air therefrom, this steam being supplied through a pipe 21'. The top 23 of the casing is also filled with steam, to exclude the air therefrom, and this steam may be obtained from the distillation of the ocotillo, or when desired, additional steam may be fed therein through a pipe 23'. Further, if desired, superheated steam may be introduced into the casing through the pipe 23', whereby the ocotillo is subjected to a preliminary steam distillation prior to being thoroughly carbonized in the lower and hotter zones of the oven.

By opening the valves 27 in the upper or cooler zone of operation the steam derived from the material under treatment, may be drawn into adjacent portion of the flue section and thus discharged from the oven along with the waste flue gases.

While I have described my process and apparatus used in the distillation of ocotillo it is to be understood that they are adapted for use in the distillation or carbonization of lignite, oil, shales or any other carbonaceous or organic materials.

While I have described my distilling oven as being preferably constructed of metal throughout, it will be understood by those skilled in the art that it may be constructed of any suitable refractory material.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, I claim:—

1. In apparatus of the character described, an upstanding outer casing, substantially vertical closed heating flues arranged therein, for forming substantially vertical passages for the reception of the material to be treated, burners arranged within the lower portion of the casing and supplying heated gases to the intake end of the flues, means for feeding the material to the upper ends of the passages, means for withdrawing the carbonized material from the lower ends of the passages, separate superposed zones having means of communication with the interior of the outer casing, outlet means for the zones, and means for introducing gases formed by the treatment of the material into the lower portion of the casing for contact with the carbonized portion of the treated material.

2. In apparatus of the character described, an outer casing, closed heating flues arranged therein and affording longitudinal passages, burners for discharging heated gases into the flues, means to feed the material to be treated into corresponding ends of the passages, means for withdrawing the carbonized material from the opposite ends of the passages, means for feeding the gases and aqueous formed by the treatment of the material into the casing in proximity to the carbonized mass of such material, and means for receiving the products of distillation within the casing.

3. In apparatus of the character described, an outer casing, flues arranged therein, burners arranged within the lower portion of the casing and discharging heated gases into the lower ends of the flues, means whereby the material to be treated may be fed into the casing in proximity to the flues, separated superposed zones having means of communication with the interior of the casing to receive the products of distillation therefrom, apertured supply chambers arranged within the casing near the burners, separate outlet pipes connected with the zones, and means of communication between the uppermost outlet pipe and the chambers 4. In apparatus of the character described, an outer casing, flues arranged therein, burners arranged within the lower portion of the casing and discharging heated gases into the lower ends of the flues, means whereby the material to be treated may be fed into the casing, separate superposed zones having means of communication with the interior of the casing to receive the products of distillation therefrom, apertured supply chambers arranged within the casing near the burners, separate outlet pipes connected with the zones, means of communication between the uppermost outlet pipe and the supply chambers, condensers connected with the outlet pipes, means of communication between the condensers and the burners, and condensers and the supply chambers.

5. In an apparatus of the character described, an outer casing, closed heating flues arranged therein forming substantially vertical passages for the reception of the material to be treated, burners arranged within the lower portion of said flues and supplying heated gases thereto, means for feeding material to the upper ends of the passages, means for withdrawing the carbonized material from the lower ends of the passages, means for collecting gases distilled in said casing, said flues being provided with openings communicating with the passages receiving the material to be treated, and means for normally closing said openings.

6. In an apparatus of the character described, an outer casing, closed heating flues arranged therein and forming spaced passages for the reception of the material to be treated, the walls of said flues being provided with openings to permit communication between said flues and said passages, means for closing said openings, means for supplying heated gases to the bottom of said flues, means to feed the material to be treated to the upper ends of said passages, means for withdrawing the carbonized material from the lower ends of said passages, and means for collecting the products of distillation within the casing.

7. The herein described process of distilling ocotillo and the like, which consists in subjecting the same to the action of heat, whereby a carbonized residue is produced, collecting the gases distilled, passing said gases through a condenser and returning the uncondensed gases to the heated mass at the point of highest temperature.

8. The herein described process of distilling ocotillo and the like, which consists in subjecting the same to the action of heat whereby a carbonized residue is produced, collecting the gases distilled, passing a portion of said gases through condensers, and returning the uncondensed gases and the remaining portion of the distilled gases to the heated mass at the point of highest temperature.

In testimony whereof I affix my signature.

SAMUEL M. DARLING.